US 9,841,224 B2

(12) United States Patent
Hitzelberger et al.

(10) Patent No.: US 9,841,224 B2
(45) Date of Patent: Dec. 12, 2017

(54) REFRIGERATOR APPLIANCES WITH PASSIVE STORAGE COMPARTMENTS

(71) Applicant: General Electric Company, Schenectady, NY (US)

(72) Inventors: Joel Erik Hitzelberger, Louisville, KY (US); Brent Alden Junge, Evansville, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 51 days.

(21) Appl. No.: 14/997,643

(22) Filed: Jan. 18, 2016

(65) Prior Publication Data

US 2017/0205137 A1    Jul. 20, 2017

(51) Int. Cl.
*F25D 23/04* (2006.01)
*F25D 17/04* (2006.01)
(Continued)

(52) U.S. Cl.
CPC ........... *F25D 23/04* (2013.01); *B01D 53/261* (2013.01); *B01D 53/268* (2013.01); *F25D 17/042* (2013.01); *F25D 17/045* (2013.01); *F25D 17/065* (2013.01); *F25D 2201/12* (2013.01); *F25D 2317/0411* (2013.01)

(58) Field of Classification Search
CPC .... F25D 17/042; F25D 17/062; F25D 17/067; F25D 23/065; F25D 23/06; F25D 2700/14; F25D 2317/0681; F25D 2400/06; F25D 2700/02; F25D 2700/123; F25D 2317/0672

USPC ..... 55/385.1; 62/317, 389; 52/172, 204.593, 52/786.13

See application file for complete search history.

(56) References Cited

U.S. PATENT DOCUMENTS 5,209,082 A    5/1993  Ha
5,468,447 A *  11/1995 Bermas ..................... A61L 9/01
                                                422/1

(Continued)

FOREIGN PATENT DOCUMENTS

DE        4233135 A1      4/1994
KR    20010045996 A       6/2001

(Continued)

*Primary Examiner* — Duane Smith
*Assistant Examiner* — Minh-Chau Pham
(74) *Attorney, Agent, or Firm* — Dority & Manning, P.A.

(57) ABSTRACT

A refrigerator appliance includes a cabinet defining a fresh food chamber, and a fresh food door rotatably hinged to the cabinet for accessing the fresh food chamber. The fresh food door includes an inner surface, an outer surface and a side surface extending between the inner surface and the outer surface. The fresh food door is rotatable between an open position and a closed position. The refrigerator appliance further includes a passive storage compartment defined within the fresh food door, and a compartment door coupled to one of the inner surface or the outer surface for accessing the storage compartment. The compartment door is movable between an open position and a closed position. The passive storage compartment maintains a temperature greater than a fresh food chamber temperature and less than an ambient temperature when the fresh food door and compartment door are closed and the refrigerator appliance is operational.

19 Claims, 5 Drawing Sheets

(51) Int. Cl.
   *F25D 17/06*      (2006.01)
   *B01D 53/26*      (2006.01)

(56) References Cited

U.S. PATENT DOCUMENTS

| | | | | |
|---|---|---|---|---|
| RE35,149 E | * | 1/1996 | Richardson | A47F 3/043 |
| | | | | 49/501 |
| 2003/0072899 A1 | * | 4/2003 | Compton | E06B 3/2605 |
| | | | | 428/34 |
| 2005/0022549 A1 | * | 2/2005 | Anderson | F25D 17/042 |
| | | | | 62/317 |
| 2006/0103269 A1 | * | 5/2006 | Artwohl | A47F 3/0434 |
| | | | | 312/116 |
| 2012/0024003 A1 | * | 2/2012 | Kim | F25D 23/126 |
| | | | | 62/389 |
| 2014/0223715 A1 | * | 8/2014 | Bippus | B23P 19/04 |
| | | | | 29/407.01 |
| 2017/0159998 A1 | * | 6/2017 | Dherde | F25D 23/065 |

FOREIGN PATENT DOCUMENTS

| | | |
|---|---|---|
| KR | 20060068751 A | 6/2006 |
| KR | 20070020964 A | 2/2007 |

* cited by examiner

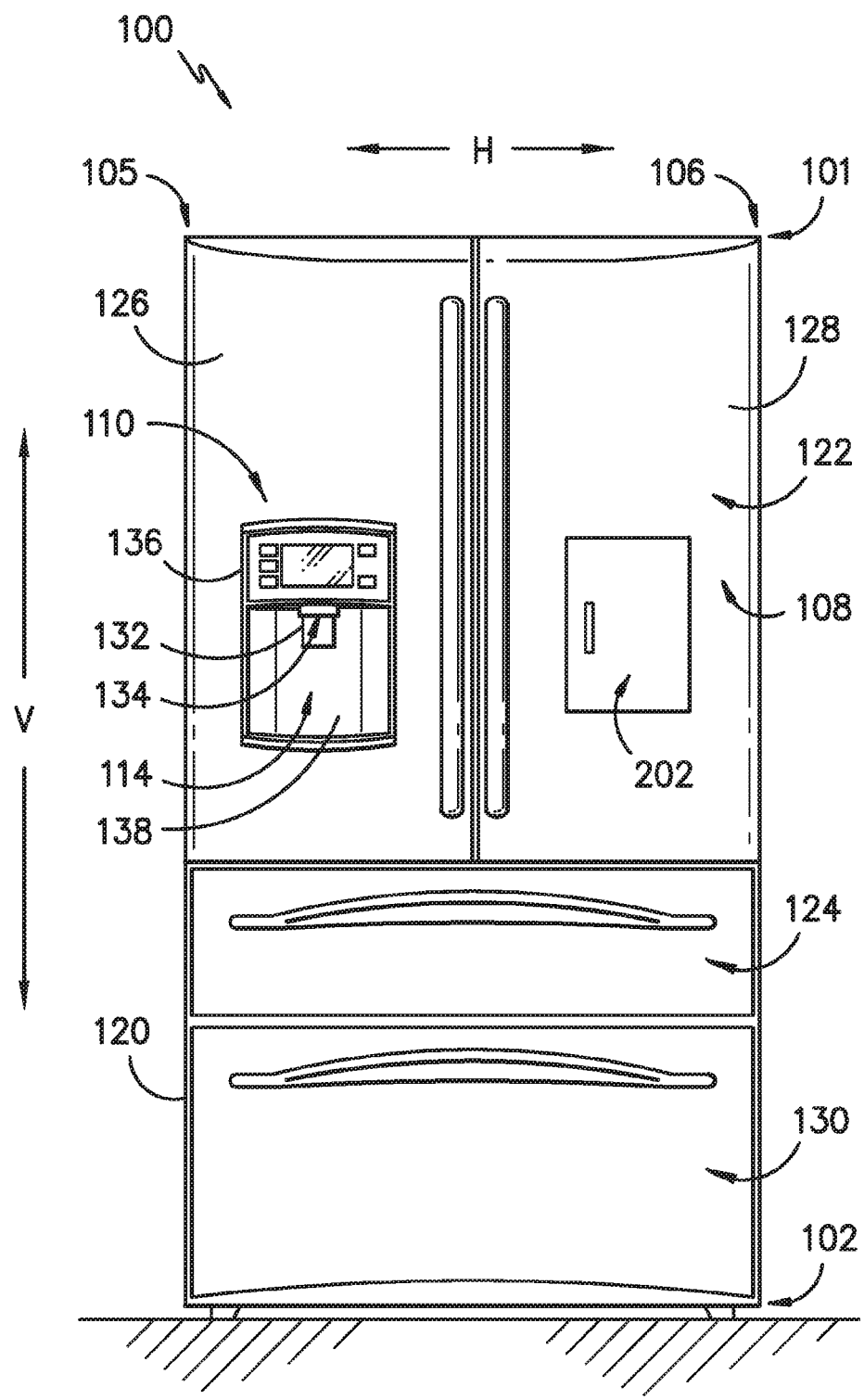
FIG. -1-

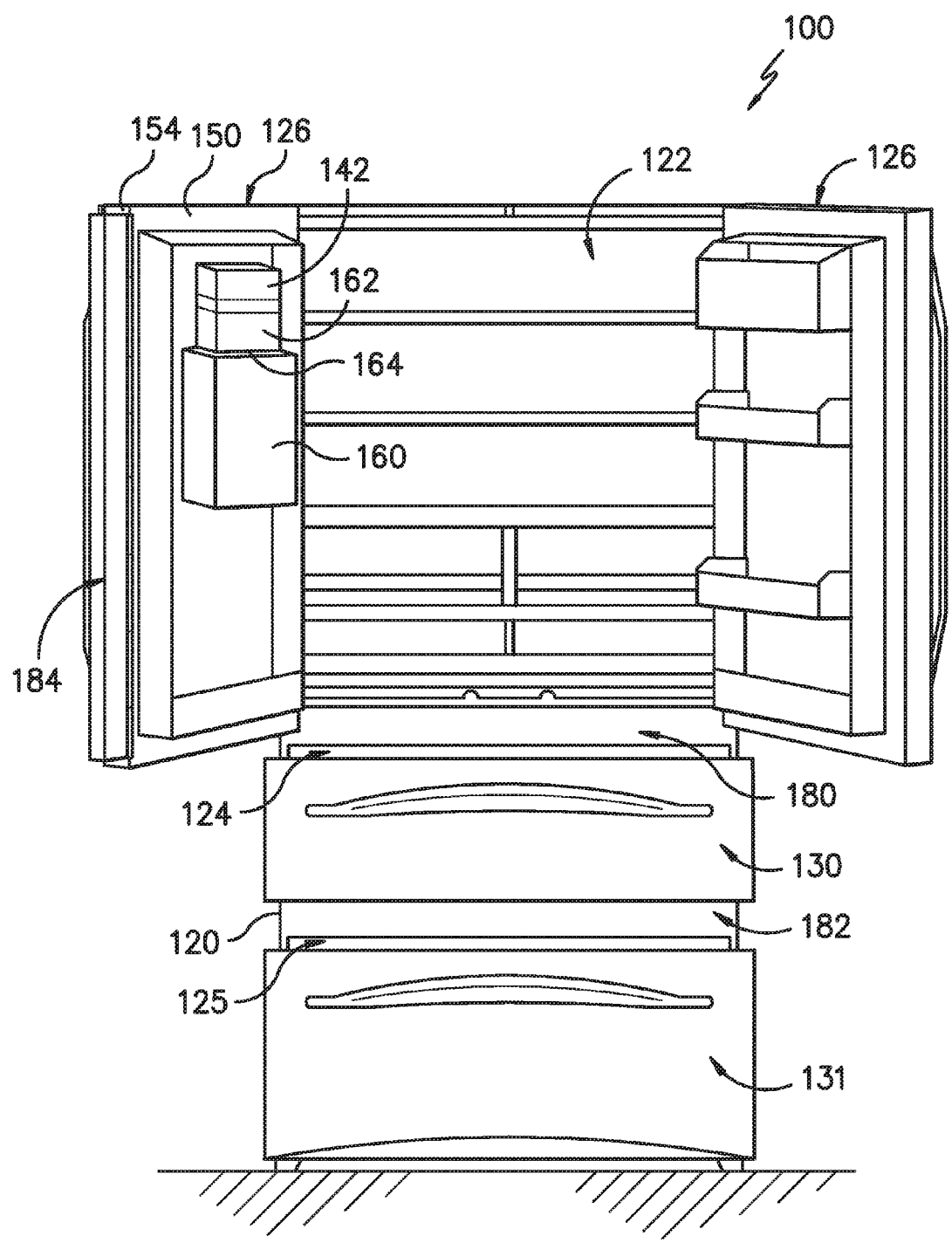
FIG. -2-

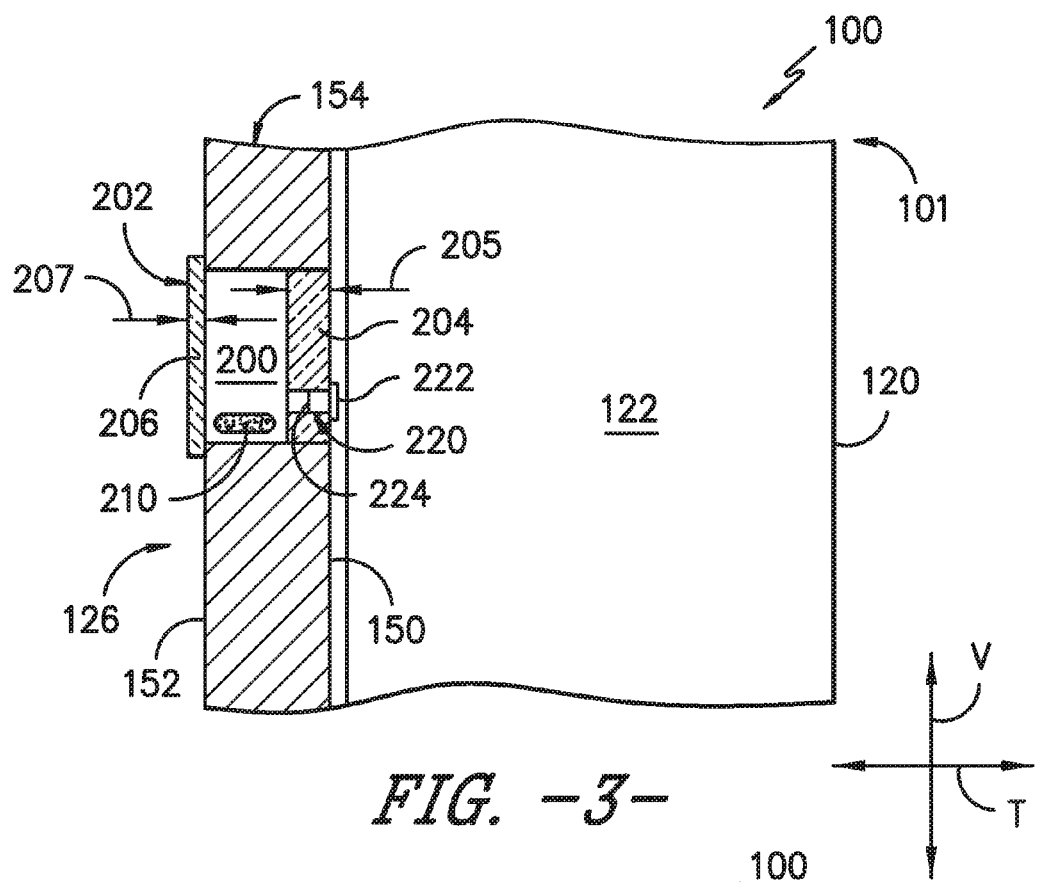
FIG. -3-
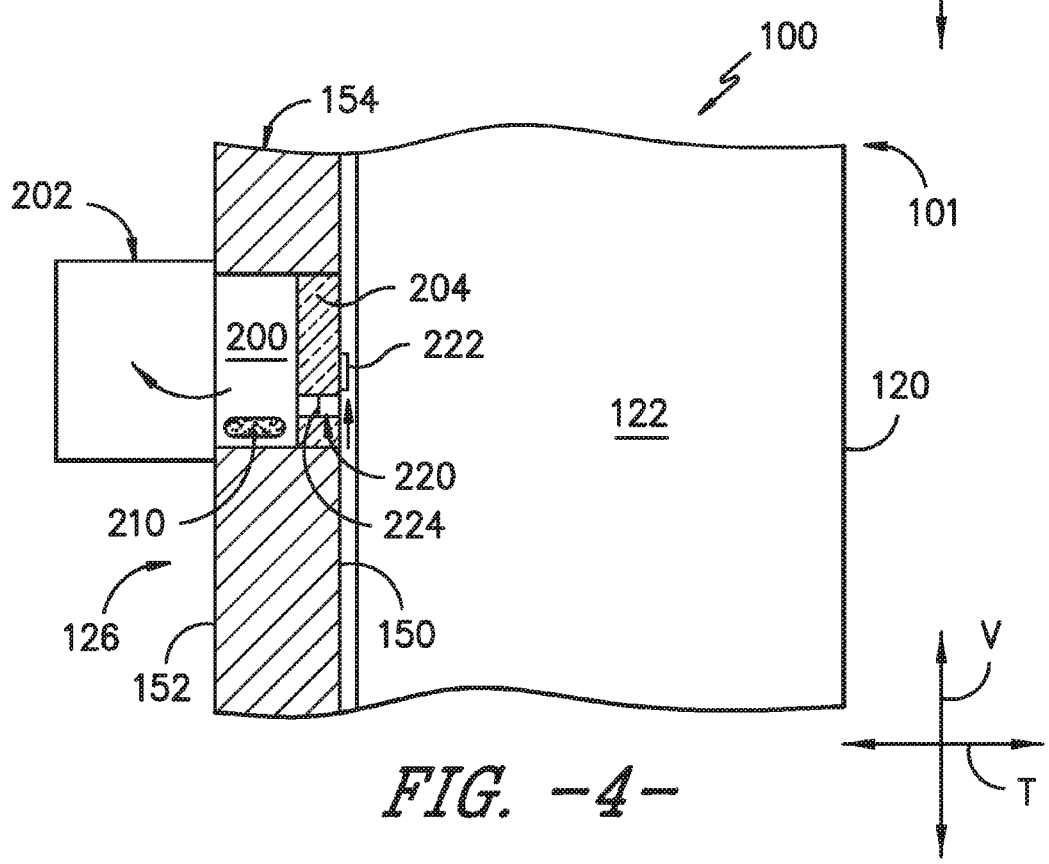
FIG. -4-

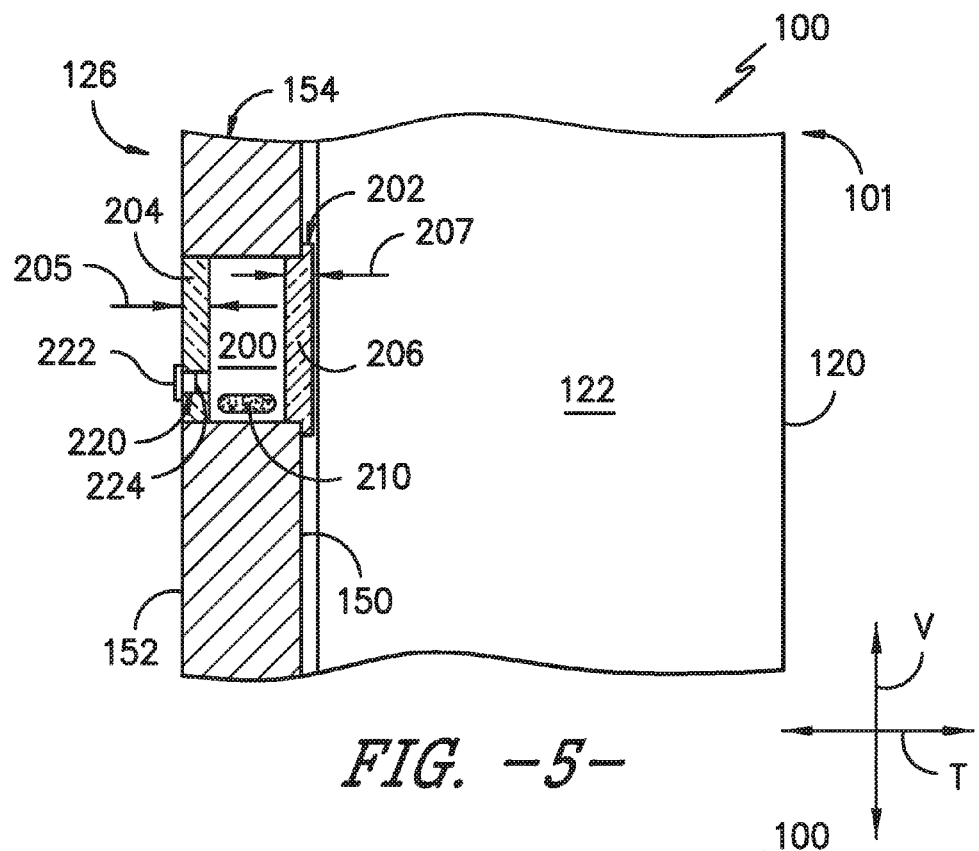
FIG. -5-
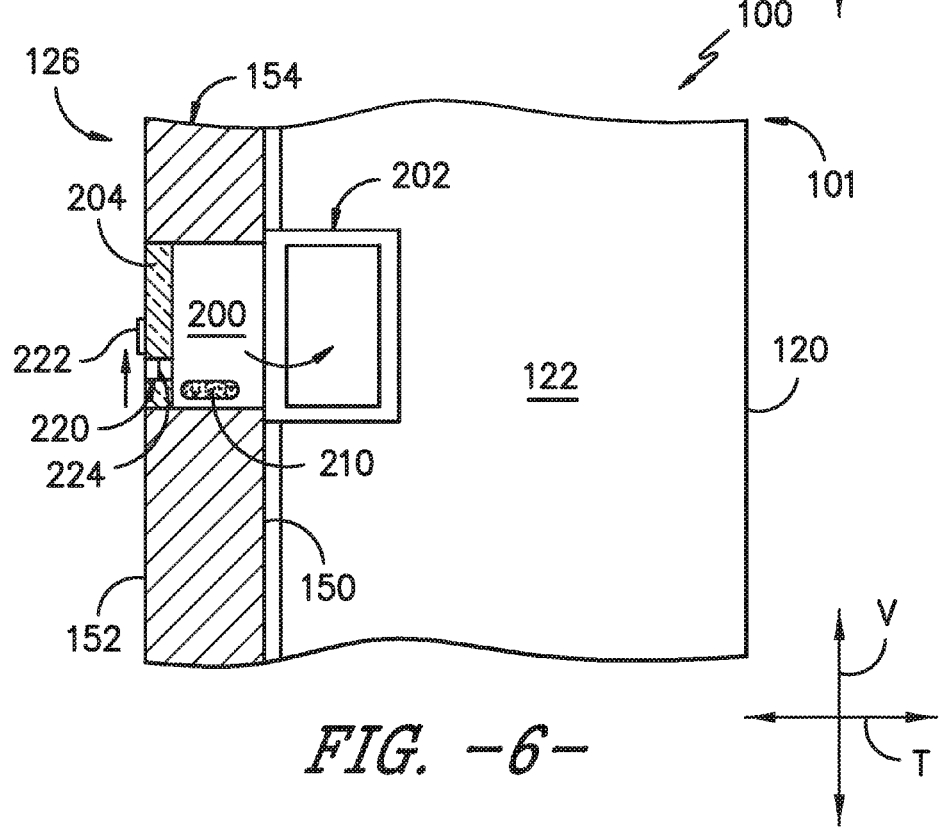
FIG. -6-

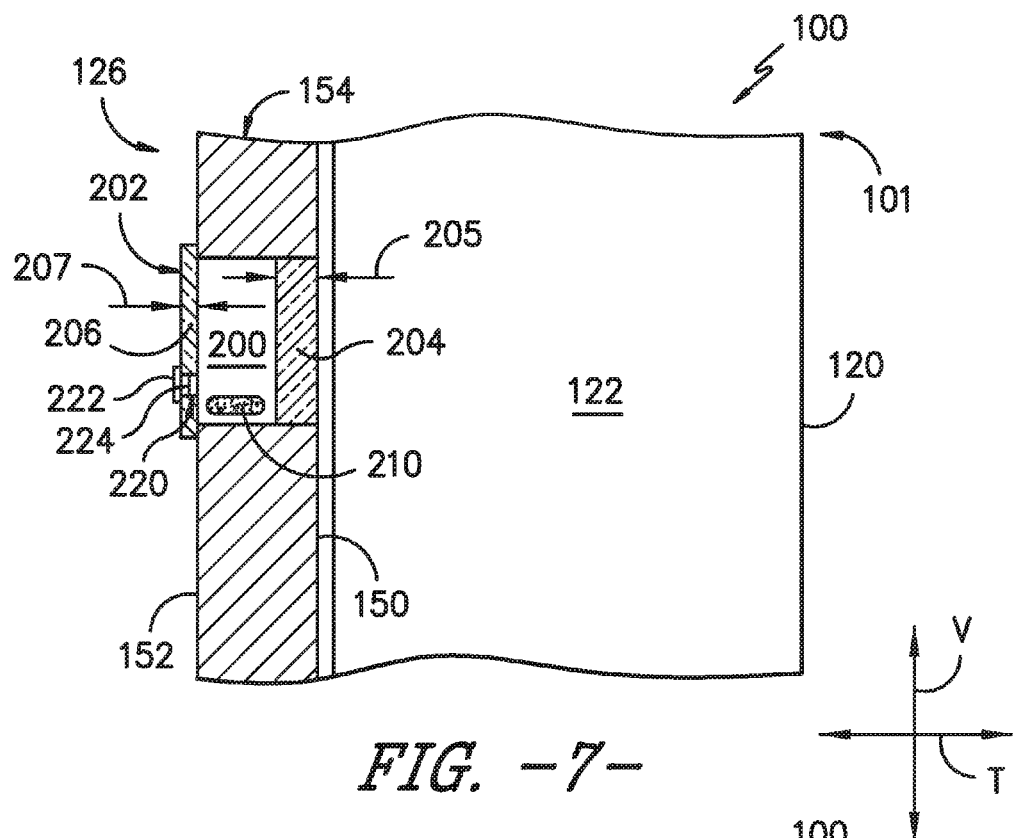
FIG. -7-
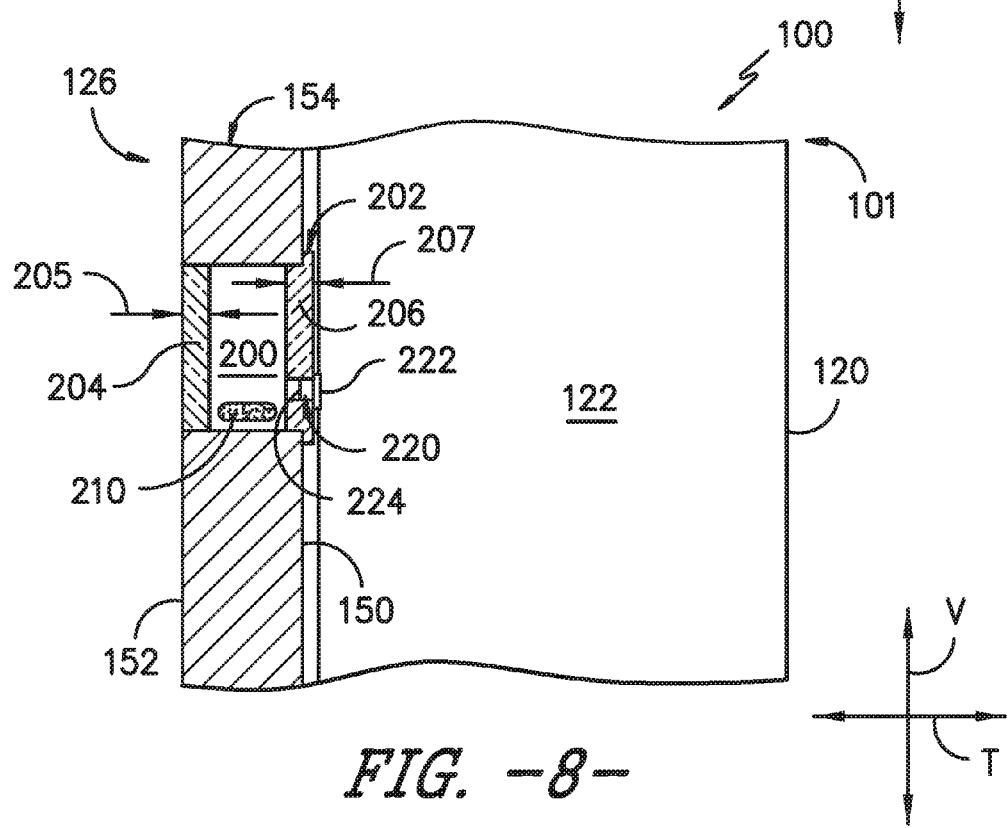
FIG. -8-

REFRIGERATOR APPLIANCES WITH PASSIVE STORAGE COMPARTMENTS

FIELD OF THE INVENTION

The present disclosure related generally to refrigerator appliances, and more particularly to refrigerator appliance which utilize passive in-door storage compartments for storage of various food items.

BACKGROUND OF THE INVENTION

Generally, refrigerator appliances include a cabinet that defines a fresh food chamber for receipt of food items for storage. Many refrigerator appliances further include one or more freezer chambers for receipt of food items for freezing and storage. A sealed refrigeration system may operate using a refrigeration cycle to actively remove heat from the fresh food chamber and freezer chambers, as is generally understood. For example, heat from air in the fresh food chamber and freezer chambers may be actively removed therefrom via heat exchange with a suitable heat exchanger flowing a refrigerant therethrough.

The fresh food chamber of a refrigerator appliance is typically set at between 36 degrees Fahrenheit and 44 degrees Fahrenheit. One concern with known refrigerator appliances, however, is that storage of some foods at such temperatures is not optimal for the life of those foods. For example, many fruits and vegetables are best stored at temperatures between 48 degrees Fahrenheit and 58 degrees Fahrenheit, such as in many cases approximately 50 degrees Fahrenheit. Storage of these foods at below such temperatures, i.e. in the fresh food chamber, can reduce the life of the foods. Similarly, storage of these foods at above such temperatures, i.e. in the ambient environment outside of the refrigerator appliance, can also reduce the life of the foods.

Accordingly, improved refrigerator appliances which offer additional storage options at various temperatures above the fresh food and freezer chamber temperatures but below ambient temperature would be desired. Further, refrigerator appliances which offer such additional storage options in an inexpensive and uncomplicated manner would be advantageous.

BRIEF DESCRIPTION OF THE INVENTION

Additional aspects and advantages of the invention will be set forth in part in the following description, or may be apparent from the description, or may be learned through practice of the invention.

In accordance with one embodiment, a refrigerator appliance is provided. The refrigerator appliance includes a cabinet defining a fresh food chamber, and a fresh food door rotatably hinged to the cabinet for accessing the fresh food chamber. The fresh food door includes an inner surface, an outer surface and a side surface extending between the inner surface and the outer surface. The fresh food door is rotatable between an open position and a closed position. The refrigerator appliance further includes a passive storage compartment defined within the fresh food door, and a compartment door coupled to one of the inner surface or the outer surface for accessing the storage compartment. The compartment door is movable between an open position and a closed position. The passive storage compartment maintains a temperature greater than a fresh food chamber temperature and less than an ambient temperature when the fresh food door and compartment door are closed and the refrigerator appliance is operational.

In accordance with another embodiment, a refrigerator appliance is provided. The refrigerator appliance includes a cabinet defining a fresh food chamber, and a fresh food door rotatably hinged to the cabinet for accessing the fresh food chamber. The fresh food door includes an inner surface, an outer surface and a side surface extending between the inner surface and the outer surface. The fresh food door is rotatable between an open position and a closed position. The refrigerator appliance further includes a passive storage compartment defined within the fresh food door, and a compartment door coupled to one of the inner surface or the outer surface for accessing the storage compartment. The compartment door is movable between an open position and a closed position. The refrigerator appliance further includes a first insulation layer and a second insulation layer, the first insulation layer disposed between the passive storage compartment and one of the inner surface or the outer surface, the second insulation layer disposed within the compartment door.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a front view of a refrigerator appliance in accordance with embodiments of the present disclosure;

FIG. 2 provides a front view of the refrigerator appliance of FIG. 1 with refrigerator doors of the refrigerator appliance shown in an open configuration to reveal a fresh food chamber and freezer chambers of the refrigerator appliance;

FIG. 3 provides a cross-sectional view of a refrigerator appliance, with a fresh food door, compartment door and vent door in closed positions in accordance with embodiments of the present disclosure;

FIG. 4 provides a cross-sectional view of the refrigerator appliance of FIG. 3, with a fresh food door, compartment door and vent door in open positions;

FIG. 5 provides another cross-sectional view of a refrigerator appliance, with a fresh food door, compartment door and vent door in closed positions in accordance with embodiments of the present disclosure;

FIG. 6 provides a cross-sectional view of the refrigerator appliance of FIG. 5, with a fresh food door, compartment door and vent door in open positions;

FIG. 7 provides another cross-sectional view of a refrigerator appliance, with a fresh food door, compartment door and vent door in closed positions in accordance with embodiments of the present disclosure; and FIG. 8 provides another cross-sectional view of a refrigerator appliance, with a fresh food door, compartment door and vent door in closed positions in accordance with embodiments of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a front view of an exemplary embodiment of a refrigerator appliance 100. Refrigerator appliance 100 extends between a top 101 and a bottom 102 along a vertical direction V. Refrigerator appliance 100 also extends between a first side 105 and a second side 106 along a horizontal direction H. Further, refrigerator appliance 100 extends between a front 108 and a back 109 along a transverse direction T, which may be defined perpendicular to the vertical and horizontal directions V, H.

Refrigerator appliance 100 includes a cabinet or housing 120 defining a fresh food chamber 122 and one or more freezer chambers, such as first freezer chamber 124 and second freezer chamber 125, which may be arranged below the fresh food chamber 122 on the vertical direction V. As such, refrigerator appliance 100 may generally be referred to as a bottom mount refrigerator. In the exemplary embodiment, housing 120 also defines a mechanical compartment (not shown) for receipt of a sealed cooling system (not shown). Using the teachings disclosed herein, one of skill in the art will understand that the present invention can be used with other types of refrigerators (e.g., side-by-sides) or a top freezer appliance as well. Consequently, the description set forth herein is for illustrative purposes only and is not intended to limit the invention in any aspect.

Refrigerator doors 126 are rotatably hinged to an edge of housing 120 for accessing fresh food chamber 122. For example, upper and lower hinges may couple each door 126 to the housing 120. It should be noted that while two doors 126 in a "french door" configuration are illustrated, any suitable arrangement of doors utilizing one, two or more doors is within the scope and spirit of the present disclosure. Freezer doors, such as first freezer door 130 and second freezer door 131, are arranged below refrigerator doors 126 for accessing freezer chamber, such as first and second freezer chambers 124, 125, respectively. In the exemplary embodiment, freezer doors 130, 131 are coupled to freezer drawers (not shown) slidably coupled within freezer chambers 124, 125. Such drawers are thus generally "pull-out" drawers in that they can be manually moved into and out of the freezer chambers 124, 125 on suitable slide mechanisms.

FIG. 2 is a perspective view of refrigerator appliance 100 having refrigerator doors 126 in an open position to reveal the interior of the fresh food chamber 122. Additionally, freezer doors 130, 131 are shown in open positions to reveal the interior of the freezer chambers 124, 125.

A door 126 of the refrigerator appliance 100 may include an inner surface 150 and an outer surface 152. The inner surface 150 generally defines the interior of the fresh food chamber 122 when the door 126 is in a closed position as shown in FIG. 1, while the outer surface 152 is generally opposite the inner surface 150 and defines the exterior of the refrigerator appliance. Side surfaces 154 may extend between and connect the inner surface 150 and outer surface 152.

Refrigerator appliance 100 may further include a dispensing assembly 110 for dispensing water and/or ice. Dispensing assembly 110 includes a dispenser 114 positioned on an exterior portion of refrigerator appliance 100. Dispenser 114 includes a discharging outlet 134 for accessing ice and water. A single paddle 132 is mounted below discharging outlet 134 for operating dispenser 114. A user interface panel 136 is provided for controlling the mode of operation. For example, user interface panel 136 includes a water dispensing button (not labeled) and an ice-dispensing button (not labeled) for selecting a desired mode of operation such as crushed or non-crushed ice.

Discharging outlet 134 and paddle 132 are an external part of dispenser 114, and are mounted in a recessed portion 138 defined in an outside surface of refrigerator door 126. Recessed portion 138 is positioned at a predetermined elevation convenient for a user to access ice or water enabling the user to access ice without the need to bend-over and without the need to access freezer chamber 124. In the exemplary embodiment, recessed portion 138 is positioned at a level that approximates the chest level of a user.

Further components of dispensing assembly 110 are illustrated in FIG. 2. Dispensing assembly 110 includes an insulated housing 142 mounted to door 126. Due to the insulation which encloses insulated housing 142, the temperature within insulated housing 142 can be maintained at levels different from the ambient temperature in the surrounding fresh food chamber 122.

The insulated housing 142 is constructed and arranged to operate at a temperature that facilitates producing and storing ice. More particularly, the insulated housing 142 contains an ice maker for creating ice and feeding the same to an ice container 160, both of which may be mounted on refrigerator door 126. As illustrated in FIG. 2, container 160 is placed at a vertical position on refrigerator door 126 that will allow for the receipt of ice from a discharge opening 162 located along a bottom edge 164 of insulated housing 142.

Referring still to FIG. 2, various mullions may be provided in refrigerator appliance 100. Mullions generally divide the various chambers of the refrigerator appliance 100 and/or prevent leakage therefrom. For example, a stationary mullion 180 may extend and be disposed between the fresh food chamber 122 and a freezer chamber, such as first freezer chamber 124. A stationary mullion 182 may additionally extend and be disposed between the first freezer chamber 124 and second freezer chamber 125. Such mullions 180, 182 may generally extend along the horizontal direction H between the various chambers, as shown. Additionally, an articulating mullion 184 may extend between the doors 126. Articulating mullion 184 may be connected to one of the doors 126. For example, articulating mullion 184 may be rotatably hinged, via hinges 186, to a door 126. Articulating mullion 184 may generally extend along the vertical direction V, as shown. When in the closed position, articulating mullion 184 may generally be positioned between the doors 126 (along the horizontal direction H) and may prevent leakage between the doors 126.

Referring now additionally to FIGS. 3 through 8, a refrigerator appliance 100 in accordance with the present disclosure may further include one or more passive storage compartments 200. A passive storage compartment in accordance with the present disclosure may advantageously be defined within the fresh food door 126, and may advantageously maintain a temperature that is greater than the fresh food chamber temperature and less than an ambient temperature in the ambient environment outside of the refrigerator appliance. For example, the passive storage compartment temperature may be maintained at between 46 degrees Fahrenheit and 60 degrees Fahrenheit, such as between 47 degrees Fahrenheit and 58 degrees Fahrenheit, such as between 48 degrees Fahrenheit and 56 degrees Fahrenheit, such as between 49 degrees Fahrenheit and 54 degrees Fahrenheit, such as between 50 degrees Fahrenheit and 52 degrees Fahrenheit. The passive storage compartment may thus advantageously be utilized to store food items such as various fruits and vegetables, as well as chocolate and other desired food items, at temperatures which prolong the lives of the food items.

Notably, such storage compartments 200 in accordance with the present disclosure are passive. Accordingly, the storage compartment 200 is not actively heated or cooled by a direct connection to a sealed refrigeration system, heater, or other active heating or cooling apparatus. For example, there is no duct-work providing direct fluid communication between a sealed refrigeration system and the storage compartment. As discussed herein, maintenance of the passive storage compartment 200 at the desired temperature is accomplished via passive heat exchange through the insulation surrounding the storage compartment 200 and venting which provides fluid communication with the fresh food chamber 122 for moisture transfer purposes.

The passive storage compartment 200 may be defined in the inner surface 150 of door 126, as illustrated in FIGS. 5, 6 and 8, or may be defined in the outer surface 152 of the door 126, as illustrated in FIGS. 1-4 and 7. A compartment door 202 may be coupled to one of the inner surface 150 or the outer surface 152, such as to the one of the inner surface 150 or outer surface 152 in which the compartment 200 is defined. Compartment door 202 may provide access to the storage compartment 200. For example, door 202 may be movable between an open position, as illustrated in FIGS. 2, 4 and 6, and a closed position, as illustrated in FIGS. 1, 5 and 7-8. In exemplary embodiments as illustrated, the door 202 is rotatable between the open and closed positions. Alternatively, however, door 202 may be slidable, detachably removable, or otherwise movable between the open position and closed position.

Notably, maintenance of the temperature greater than the fresh food chamber 122 temperature and less than the ambient temperature may occur at least when the fresh food door 122 and compartment door 202 are closed and the refrigerator appliance 100 is operational (i.e. the sealed refrigeration system is active such that the fresh food chamber 126 is at a fresh food chamber temperature (i.e. between 36 degrees Fahrenheit and 44 degrees Fahrenheit).

Additionally, it should be noted that an ambient temperature in accordance with the present disclosure is a regulated indoor temperature, and thus may for example be between 62 degrees Fahrenheit and 80 degrees Fahrenheit, such as between 64 degrees Fahrenheit and 78 degrees Fahrenheit, such as between 66 degrees Fahrenheit and 76 degrees Fahrenheit, such as between 68 degrees Fahrenheit and 74 degrees Fahrenheit.

Insulation layers may generally be provided to surround the passive storage compartment 200 and passively regulate the temperature thereof. For example, a first insulation layer 204 and a second insulation layer 206 may be provided. The first insulation layer 204 may be disposed between the passive storage compartment 200 and one of the inner surface 150 or the outer surface 152 (such as the one of the inner surface 150 or the outer surface 152 in which the compartment 200 is not defined.) For example, FIGS. 3, 4 and 7 illustrate the first insulation layer 204 defined between the compartment 200 and the inner surface 150. FIGS. 5, 6 and 8 illustrate the first insulation layer 204 defined between the compartment 200 and the outer surface 152. The second insulation layer 206 may be disposed within the compartment door 202. The passive storage compartment 200 is thus, when the compartment door 202 is closed, disposed between the first and second insulation layers 204, 206.

The insulation utilized in the first and second insulation layers 204, 206 may, for example, be foamed-in insulation or another suitable insulation typically utilized in a refrigerator appliance. Alternatively, other suitable insulation materials may be utilized. In exemplary embodiments, the first and second insulation layers 204, 206 may be formed from the same material, although in alternative embodiments the first and second insulation layers 204, 206 may be formed from different materials. Additionally, in exemplary embodiments, the first and second insulation layers 204, 206 may have different maximum thicknesses 205, 207, although in alternative embodiments the first and second insulation layers 204, 205 may have the same maximum thickness 205, 207. For example, in some embodiments, the one of the first and second insulation layers 204, 206 that is between the passive storage compartment 200 and the fresh food chamber 122 (when the doors 122, 202 are closed) may have a maximum thickness 205, 207 that is between 1.5 and 2.5 times, such as between 1.8 and 2.2 times, such as 2 times, the maximum thickness 207, 205 of the other one of the first and second insulation layers 206, 204.

The first and second insulation layers 204, 206 may be individually tailored to provide the required insulation qualities which allow the passive storage compartment 200 to passively maintain the desired temperature as discussed herein. Accordingly, in some embodiments, the maximum thicknesses 205, 207, materials, and other characteristics may vary on a case-by-case basis to provide such advantages.

In some embodiments, as illustrated in FIGS. 3 through 8, a desiccant 210 may be disposed within the passive storage compartment 200. The desiccant 210 may, for example, include silica, activated charcoal, calcium sulfate, calcium chloride, and/or a molecular sieve such as a zeolite. The desiccant 210 may advantageously reduce moisture within the passive storage compartment 200 via adsorption.

Additionally or alternatively, in some embodiments, one or more vent apertures 220 may be provided. The vent apertures 220 may facilitate adjustments in, such as fine-tuning of, the temperature within the storage compartment 200, and may further allow moisture transmission to and/or from the storage compartment 200. In some embodiments, as illustrated in FIGS. 3, 4 and 8, a vent aperture 220 may constantly or selectively provide fluid communication between the fresh food chamber 122 and the passive storage compartment 200. For example, the vent aperture 220 may be defined in the door 126 or the door 202, and in particular may be defined in the one of the first and second insulation layers 204, 206 that is between the passive storage compartment 200 and the fresh food chamber 122. Accordingly, when the doors 126, 202 are closed, constant or selective fluid communication is facilitated. In other embodiments, as illustrated in FIGS. 5 through 7, a vent aperture 220 may constantly or selectively provide fluid communication between the passive storage compartment 200 and the ambient environment. For example, the vent aperture 220 may be defined in the door 126 or the door 202, and in particular may be defined in the one of the first and second insulation layers 204, 206 that is between the passive storage compartment 200 and the ambient environment. Accordingly, when the doors 126, 202 are closed, constant or selective fluid communication is facilitated.

In some embodiments, such fluid communication may be constant, and the vent aperture 220 may thus be left constantly open to facilitate such constant fluid communication. In other embodiments, such fluid communication may be selective. For example, as illustrate a vent door 222 may be utilized to facilitate selective fluid communication, and may be movable between an open position, as illustrated in FIGS. 4 and 6, and a closed position, as illustrated in FIGS. 3, 5, 7 and 8. In the open position, the vent door 222 does not block the vent aperture 220, and the vent aperture provides fluid communication between the storage compartment 200 and the fresh food chamber 122 or ambient environment. In the closed position, the vent door 222 does block the vent aperture 220, and fluid communication between the storage compartment 200 and the fresh food chamber 122 or ambient environment is prevented.

The vent door 222 can be positioned in the storage compartment 200 (such as when the door 202 is closed), in the fresh food chamber 122 (when the door 126 is shown, or in the ambient environment. In exemplary embodiments as illustrated, the vent door 222 is slidable between the open and closed positions. Alternatively, however, vent door 222 may be rotatable, detachably removable, or otherwise movable between the open position and closed position.

In exemplary embodiments, a filter 224 may be disposed within the vent aperture 220. Filter 224 may, for example, prevent moisture transmission through the vent aperture 220 in one or both directions; i.e. to the storage compartment 200 and/or from the storage compartment 200. For example, in some embodiments, filter 224 may be a membrane, such as a polytetrafluoroethylene ("PTFE") membrane (such as GORE-TEX® brand membrane).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance, the refrigerator appliance comprising:
   a cabinet defining a fresh food chamber;
   a fresh food door rotatably hinged to the cabinet for accessing the fresh food chamber, the fresh food door comprising an inner surface, an outer surface and a side surface extending between the inner surface and the outer surface, the fresh food door rotatable between an open position and a closed position;
   a passive storage compartment defined within the fresh food door; and
   a compartment door coupled to one of the inner surface or the outer surface for accessing the storage compartment, the compartment door movable between an open position and a closed position,
   wherein the passive storage compartment maintains a temperature greater than a fresh food chamber temperature and less than an ambient temperature when the fresh food door and compartment door are closed and the refrigerator appliance is operational,
   wherein the fresh food door further defines a vent aperture in selective fluid communication between the passive storage compartment and one of the fresh food chamber or an ambient environment to facilitate adjustments in temperature within the fresh food compartment,
   wherein a vent door is mounted on the fresh food door and movable between an open position and a closed position, the open position permitting fluid communication between the storage compartment and the one of the fresh food chamber or the ambient environment, and the closed position preventing fluid communication between the storage compartment and the one of the fresh food chamber or the ambient environment, and
   wherein the refrigerator appliance further comprises a moisture filter disposed within the vent aperture and preventing moisture transmission therethrough between the passive storage compartment and the one of the fresh food chamber or the ambient environment.

2. The refrigerator appliance of claim 1, further comprising a first insulation layer and a second insulation layer, the first insulation layer disposed between the passive storage compartment and one of the inner surface or the outer surface, the second insulation layer disposed within the compartment door.

3. The refrigerator appliance of claim 2, wherein the compartment door is coupled to the outer surface and the first insulation layer is disposed between the passive storage compartment and the inner surface.

4. The refrigerator appliance of claim 2, wherein the compartment door is coupled to the inner surface and the first insulation layer is disposed between the passive storage compartment and the outer surface.

5. The refrigerator appliance of claim 2, wherein the first insulation layer and the second insulation layer are formed from the same material.

6. The refrigerator appliance of claim 2, wherein the first insulation layer and the second insulation layer have different maximum thicknesses.

7. The refrigerator appliance of claim 1, wherein in the open position the vent aperture provides fluid communication between the fresh food chamber and the storage compartment and in the closed position fluid communication between the fresh food chamber and the storage compartment through the vent aperture is prevented.

8. The refrigerator appliance of claim 1, wherein in the open position the vent aperture provides fluid communication between an ambient environment and the storage compartment and in the closed position fluid communication between the ambient environment and the storage compartment through the vent aperture is prevented.

9. The refrigerator appliance of claim 8, further comprising a filter disposed within the vent aperture.

10. The refrigerator appliance of claim 1, further comprising a desiccant disposed within the storage compartment.

11. The refrigerator appliance of claim 1, wherein the compartment door is rotatable between the open position and the closed position.

12. A refrigerator appliance, the refrigerator appliance comprising:
    a cabinet defining a fresh food chamber;
    a fresh food door rotatably hinged to the cabinet for accessing the fresh food chamber, the fresh food door comprising an inner surface, an outer surface and a side surface extending between the inner surface and the outer surface, the fresh food door rotatable between an open position and a closed position;
    a passive storage compartment defined within the fresh food door; and a compartment door coupled to one of the inner surface or the outer surface for accessing the storage compartment, the compartment door movable between an open position and a closed position; and a first insulation layer and a second insulation layer, the first insulation layer disposed between the passive storage compartment and one of the inner surface or the outer surface, the second insulation layer disposed within the compartment door, wherein the first insulation layer defines a vent aperture in selective fluid communication between the passive storage compartment and one of the fresh food chamber or an ambient environment to facilitate adjustments in temperature within the fresh food compartment, wherein a vent door is mounted on the fresh food door and movable between an open position and a closed position, the open position permitting fluid communication between the storage compartment and the one of the fresh food chamber or the ambient environment, and the closed position preventing fluid communication between the storage compartment and the one of the fresh food chamber or the ambient environment, and wherein the refrigerator appliance further comprises a moisture filter disposed within the vent aperture and preventing moisture transmission therethrough between the passive storage compartment and the one of the fresh food chamber or the ambient environment.

13. The refrigerator appliance of claim 12, wherein the compartment door is coupled to the outer surface and the first insulation layer is disposed between the passive storage compartment and the inner surface.

14. The refrigerator appliance of claim 12, wherein the compartment door is coupled to the inner surface and the first insulation layer is disposed between the passive storage compartment and the outer surface.

15. The refrigerator appliance of claim 12, wherein the first insulation layer and the second insulation layer are formed from the same material.

16. The refrigerator appliance of claim 12, wherein the first insulation layer and the second insulation layer have different maximum thicknesses.

17. The refrigerator appliance of claim 12, wherein in the open position the vent aperture provides fluid communication between the fresh food chamber and the storage compartment and in the closed position fluid communication between the fresh food chamber and the storage compartment through the vent aperture is prevented.

18. The refrigerator appliance of claim 12, wherein in the open position the vent aperture provides fluid communication between an ambient environment and the storage compartment and in the closed position fluid communication between the ambient environment and the storage compartment through the vent aperture is prevented.

19. A refrigerator appliance, the refrigerator appliance comprising:

a cabinet defining a fresh food chamber;

a fresh food door rotatably hinged to the cabinet for accessing the fresh food chamber, the fresh food door comprising an inner surface, an outer surface and a side surface extending between the inner surface and the outer surface, the fresh food door rotatable between an open position and a closed position;

a passive storage compartment defined within the fresh food door; and a compartment door coupled to one of the inner surface or the outer surface for accessing the storage compartment, the compartment door movable between an open position and a closed position; and a first insulation layer and a second insulation layer, the first insulation layer disposed between the passive storage compartment and one of the inner surface or the outer surface, the second insulation layer disposed within the compartment door, wherein the first insulation layer comprises a foamed insulation defining a vent aperture in selective fluid communication between the passive storage compartment and one of the fresh food chamber or an ambient environment to facilitate adjustments in temperature within the fresh food compartment, wherein a vent door is mounted on the fresh food door and movable between an open position and a closed position, the open position permitting fluid communication between the storage compartment and the one of the fresh food chamber or the ambient environment, and the closed position preventing fluid communication between the storage compartment and the one of the fresh food chamber or the ambient environment, and wherein the refrigerator appliance further comprises a moisture filter disposed within the vent aperture and preventing moisture transmission therethrough between the passive storage compartment and the one of the fresh food chamber or the ambient environment.

* * * * *